US007178596B2

(12) United States Patent
Blauch et al.

(10) Patent No.: US 7,178,596 B2
(45) Date of Patent: *Feb. 20, 2007

(54) METHODS FOR IMPROVING PROPPANT PACK PERMEABILITY AND FRACTURE CONDUCTIVITY IN A SUBTERRANEAN WELL

(75) Inventors: Matthew E. Blauch, Duncan, OK (US); Philip D. Nguyen, Duncan, OK (US); Thomas D. Welton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 256 days.

This patent is subject to a terminal disclaimer.

(21) Appl. No.: 10/947,427

(22) Filed: Sep. 20, 2004

(65) Prior Publication Data

US 2005/0059558 A1 Mar. 17, 2005

Related U.S. Application Data

(63) Continuation-in-part of application No. 10/608,291, filed on Jun. 27, 2003, now Pat. No. 7,044,220.

(51) Int. Cl.
*E21B 43/267* (2006.01)

(52) U.S. Cl. .............................. 166/280.2; 166/280.1; 166/295; 166/300; 507/211; 507/219; 507/220; 507/226; 507/260; 507/273; 507/924

(58) Field of Classification Search ............... 166/276, 166/278, 280.1, 280.2, 281, 295, 300, 308.1, 166/308.2; 507/211, 219, 220, 226, 260, 507/273, 924
See application file for complete search history.

(56) References Cited

U.S. PATENT DOCUMENTS

| 2,238,671 | A | 4/1941 | Woodhouse ................. 166/21 |
| 2,703,316 | A | 3/1955 | Palmer ....................... 260/78.3 |
| 3,173,484 | A | 3/1965 | Huitt et al. .............. 166/280.1 |
| 3,195,635 | A | 7/1965 | Fast ......................... 166/280.1 |
| 3,272,650 | A | 9/1966 | MacVittie ....................... 134/7 |
| 3,302,719 | A | 2/1967 | Fischer .................... 166/280.2 |
| 3,364,995 | A | 1/1968 | Atkins et al. ............. 166/280.1 |
| 3,366,178 | A | 1/1968 | Malone et al. ........... 166/280.1 |
| 3,455,390 | A | 7/1969 | Gallus ........................ 166/295 |
| 3,784,585 | A | 1/1974 | Schmitt et al. ............. 260/861 |
| 3,819,525 | A | 6/1974 | Hattenbrun ................. 252/132 |
| 3,828,854 | A | 8/1974 | Templeton et al. ......... 166/307 |
| 3,868,998 | A | 3/1975 | Lybarger et al. ............ 166/278 |
| 3,912,692 | A | 10/1975 | Casey et al. ............... 260/78.3 |
| 3,948,672 | A | 4/1976 | Harnsberger ................ 106/720 |
| 3,955,993 | A | 5/1976 | Curtice et al. ............. 106/662 |
| 3,960,736 | A | 6/1976 | Free et al. ................. 252/8.55 |
| 3,968,840 | A | 7/1976 | Tate ........................ 166/280.1 |
| 3,998,272 | A | 12/1976 | Maly .......................... 166/281 |
| 3,998,744 | A | 12/1976 | Arnold et al. ............... 507/269 |
| 4,068,718 | A | 1/1978 | Cooke, Jr. et al. ........ 166/280.2 |
| 4,169,798 | A | 10/1979 | DeMartino ............. 252/8.55 R |
| 4,172,066 | A | 10/1979 | Zweigle et al. ........ 260/29.6 TA |
| 4,261,421 | A | 4/1981 | Watanabe .................... 166/281 |
| 4,387,769 | A | 6/1983 | Erbstoesser et al. ........ 507/219 |
| 4,460,052 | A | 7/1984 | Gockel ......................... 175/72 |
| 4,470,915 | A | 9/1984 | Conway ................ 252/8.55 R |
| 4,498,995 | A | 2/1985 | Gockel ................... 252/8.5 LC |
| 4,526,695 | A | 7/1985 | Erbstoesser et al. ........ 507/219 |
| 4,694,905 | A | 9/1987 | Armbruster ................. 166/280 |
| 4,715,967 | A | 12/1987 | Bellis et al. .............. 252/8.551 |
| 4,716,964 | A | 1/1988 | Erbstoesser et al. ........ 166/284 |
| 4,785,884 | A | 11/1988 | Armbruster ................. 166/280 |
| 4,797,262 | A | 1/1989 | Dewitz ....................... 422/142 |
| 4,809,783 | A | 3/1989 | Hollenbeck et al. ........ 166/307 |
| 4,817,721 | A | 4/1989 | Pober ......................... 166/295 |
| 4,843,118 | A | 6/1989 | Lai et al. .................... 524/555 |

(Continued)

FOREIGN PATENT DOCUMENTS

EP 0 510 762 A2 4/1992

(Continued)

OTHER PUBLICATIONS

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

(Continued)

*Primary Examiner*—George Suchfield
(74) *Attorney, Agent, or Firm*—Robert A. Kent; Baker Botts

(57) ABSTRACT

The present invention provides compositions and methods for enhancing subterranean well productivity by enhancing fracture conductivity. A method of increasing the conductivity of a fracture in a portion of a subterranean formation comprising providing a slurry comprising a fracturing fluid, a degradable material, and proppant particulates coated with a tackifying agent; allowing the degradable material to become at least temporarily attached to the tackifying agent coated onto the proppant particulates so as to avoid substantial segregation of the degradable material from the proppant particulates within the slurry; introducing the slurry to the fracture and allowing the proppant particulates and degradable material to form a substantially uniform particulate pack; and, allowing the degradable material to degrade and produce a particulate pack having voids therein.

40 Claims, No Drawings

U.S. PATENT DOCUMENTS

| | | | |
|---|---|---|---|
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,082,056 A | 1/1992 | Tackett, Jr. | 166/295 |
| 5,142,023 A | 8/1992 | Gruber et al. | 528/354 |
| 5,216,050 A | 6/1993 | Sinclair | 524/108 |
| 5,247,059 A | 9/1993 | Gruber et al. | 528/354 |
| 5,249,627 A | 10/1993 | Harms et al. | 166/308 |
| 5,249,628 A | 10/1993 | Surjaatmadja | 166/305 |
| 5,295,542 A | 3/1994 | Cole et al. | 166/278 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,839,510 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,059,034 A | 5/2000 | Rickards et al. | 166/280 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,439,309 B1 | 8/2002 | Matherly et al. | 166/276 |
| 6,454,003 B1 | 9/2002 | Chang et al. | 166/270 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,817,414 B2 | 11/2004 | Lee | 166/278 |
| 6,896,058 B2 | 5/2005 | Munoz, Jr. et al. | 166/279 |
| 6,949,491 B2 | 9/2005 | Cooke, Jr. | 507/219 |
| 7,044,220 B2 * | 5/2006 | Nguyen et al. | 166/280.2 |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0103496 A1 | 5/2005 | Todd et al. | 166/278 |
| 2005/0252659 A1 | 11/2005 | Sullivan et al. | 166/280.1 |
| 2005/0272613 A1 | 12/2005 | Cooke, Jr. | 507/219 |
| 2006/0032633 A1* | 2/2006 | Nguyen | 166/280.2 |
| 2006/0065397 A1* | 3/2006 | Nguyen et al. | 166/280.1 |
| 2006/0118299 A1* | 6/2006 | Nguyen et al. | 166/276 |

FOREIGN PATENT DOCUMENTS

| | | |
|---|---|---|
| EP | 0 879 935 A2 | 11/1998 |
| EP | 0 879 935 A3 | 10/1999 |
| EP | 1 413 710 A1 | 4/2004 |
| EP | 1 447 523 A1 | 8/2004 |
| GB | 2 348 907 A | 10/2000 |
| WO | WO 93/15127 A1 | 8/1993 |
| WO | WO 94/07949 A1 | 4/1994 |

| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 2000/57022 | 9/2000 |
| WO | WO 2001/02698 | 1/2001 |
| WO | WO 01/87797 A1 | 11/2001 |
| WO | WO 02/12674 A1 | 2/2002 |
| WO | WO 03/027431 | 4/2003 |
| WO | WO 03/027431 A2 | 4/2003 |
| WO | WO 03/027431 A3 | 4/2003 |
| WO | WO 2004/007905 | 1/2004 |
| WO | WO 04/037946 A1 | 5/2004 |
| WO | WO 04/038176 A1 | 5/2004 |
| WO | WO 05/085595 A1 | 9/2005 |

OTHER PUBLICATIONS

Todd, et al., *A Chemcial "Trigger" Useful for Oilfield Applications*, Society of Petroleum Engineers, Inc., SPE 92709, Feb. 4, 2005.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept to Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.

M. Ahmad, et al.: "Ortho Ester Hydrolysis: Direct Evidence for a Three-Stage Reaction Mechanism,"Engineering Information Inc., NY, NY, vol. 101, No. 10 (XP-002322843), May 9, 1979.

Attia, Yosry, et al, *Adsorption Thermodynamics of a Hydrophobic Polymeric Flocculant on Hydrophobic Colloidal Coal Particles*, 1991, American Chemical Society, Langmuir, 7, pp. 2203-2207.

U.S. Appl. No. 10/650,101, filed Aug. 26, 2003, Todd et al.

U.S. Appl. No. 10/655,883, filed Jul. 7, 2004, Nguyen.
U.S. Appl. No. 10/661,173, filed Sep. 11, 2003, Todd et al.
U.S. Appl. No. 10/664,126, filed Sep. 17, 2003, Todd et al.
U.S. Appl. No. 10/736,152, filed Dec. 15, 2003, Todd.
U.S. Appl. No. 10/765,334, filed Jan. 27, 2004, Todd et al.
U.S. Appl. No. 10/768,323, filed Jan. 30, 2004, Roddy et al.
U.S. Appl. No. 10/768,864, filed Jan. 30, 2004, Roddy et al.
U.S. Appl. No. 10/769,490, filed Jan. 30, 2004, Roddy et al.
U.S. Appl. No. 10/783,207, filed Feb. 20, 2004, Surjaatmadja et al.
U.S. Appl. No. 10/785,300, filed Feb. 24, 2004, Frost et al.
U.S. Appl. No. 10/802,340, filed Mar. 17, 2004, Reddy et al.
U.S. Appl. No. 10/803,668, filed Mar. 17, 2004, Todd et al.
U.S. Appl. No. 10/803,689, filed Mar. 18, 2004, Todd et al.
U.S. Appl. No. 10/832,163, filed Apr. 26, 2004, Munoz, Jr. et al.
U.S. Appl. No. 10/897,509, filed Jul. 23, 2004, Pauls et al.
U.S. Appl. No. 10/915,024, filed Aug. 10, 2004, Nguyen.
U.S. Appl. No. 10/932,749, filed Sep. 2, 2004, Harris et al.
U.S. Appl. No. 10/933,705, filed Sep. 3, 2004, Kalman.
U.S. Appl. No. 10/608,291, filed Jun. 27, 2003, Nguyen et al.
U.S. Appl. No. 11/048,465, Todd et al.
U.S. Appl. No. 11/048,489, Todd et al.

Foreign Search Report and Opinion (PCT Appl. No. GB2004/002719, Jun. 24, 2004.

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5, (764-795).

Vichaibun, et al, *A New Assay for the Enzymatic Degradation of Polylactic Acid, Short Report*, ScienceAsia, vol. 29, 2003 (pp. 297-300).

Halliburton, SurgiFrac$^{SM}$ Service, *A Quick and Cost-Effective Method to Help Boost Production From Openhole Horizontal Completions*, Halliburton Communications, HO3297, 2002.

Halliburton, Cobra Frac$^{SM}$ Service, *Coiled Tubing Fracturing—Cost-Effective Method for Stimulating Untapped Reserves*, HO2319R, Halliburton Energy Services, 2000.

Halliburton, CobraJet Frac$^{SM}$ Service, *Cost-effective Technology That Can Help Reduce Cost Per BOE Produced, Shorten Cycle Time and Reduce Capex*, Halliburton Communications.

Blauch, et al, *Aqueous Tackifier and Methods of Controlling Particulates*, U.S. Appl. No. 10/864,061, filed Jun. 9, 2004.

Blauch, et al, *Aqueous-Based Tackifier Fluids and Methods of Use*, U.S. Appl. No. 10/864,618, filed Jun. 9, 2004.

Foreign Counterpart and Search Report for International Patent Application No. PCT/GB2005/002984, Nov. 28, 2005.

"Poly(phenyllactide): Synthesis, Characterization, and Hydrolytic Degradation" published in Biomacromolecules, vol. 2, No. 3, 2001, pp. 658-663 by Tara L. Simmons and Gregory L. Baker.

"Synthesis and Properties of Polymers Derived from Substituted Lactic Acids" published in 2001 American Chemical Society, Chapter 12, pp. 147-159 by Mao Yin, Tara L. Simmons and Gregory L. Baker.

"Preparation and Characterization of Substituted Polylactides" published in 199 American Chemical Society, vol. 32, No. 23, pp. 7711-7718 by Mao Yin and Gregory L. Baker.

* cited by examiner

METHODS FOR IMPROVING PROPPANT PACK PERMEABILITY AND FRACTURE CONDUCTIVITY IN A SUBTERRANEAN WELL

CROSS REFERENCE TO RELATED APPLICATIONS

This application is a continuation-in-part of U.S. application Ser. No. 10/608,291, filed on Jun. 27, 2003, now U.S. Pat. No. 7,044,220.

BACKGROUND OF THE INVENTION

The present invention provides improved compositions and methods for enhancing fluid flow from a subterranean formation. In preferred embodiments, the present invention provides compositions and methods for enhancing subterranean well productivity by enhancing fracture conductivity.

Hydraulic fracturing is a technique for stimulating the production of a subterranean formation. The technique generally involves injecting a viscous liquid through a well bore into a portion of a subterranean formation at a chosen rate and pressure to overcome the formation's stresses and form or enhance a fracture in the formation; and placing proppant particulates in the fracture to, among other things, maintain the fracture in a propped condition when the injection pressure is released. The resultant propped fracture provides a conductive channel in the formation for fluids to flow to the well bore.

The degree of stimulation afforded by the hydraulic fracture treatment is largely dependent on the permeability and width of the propped fracture. Thus, the productivity of the well, in effect, becomes a function of fracture conductivity. To enhance well productivity, it may be necessary to enhance fracture conductivity.

Oftentimes, to effectively prop open the fractures as well as to prevent proppant particulate flow back, the proppant particulates are caused to consolidate within the fractures. One conventional means of doing this is to use resin-coated proppant particulates so that when the resin cures, the proppant particulates can consolidate into a mass within the fractures.

Although consolidating the proppant particulates within a fracture may have some benefits, for example, preventing proppant particulate flow back, such methods may adversely affect the conductivity of the fracture. That is, some methods of consolidating proppant particulates themselves may introduce a barrier to the free flow of fluids from the subterranean formation to the well bore for subsequent production. Fracture conductivity may suffer as a result. This is undesirable as this may affect overall well productivity.

To counteract this potential problem, many different techniques have been developed. One technique involves adding calcium carbonate or salt to the proppant composition. Once the proppant particulates have substantially consolidated, the carbonate or salt dissolves. At least one problem associated with this method is the incomplete removal of the carbonate or salt if not adequately contacted with a fluid capable of dissolving the carbonate or salt. Another method has been to add wax particulates to the proppant composition. Once incorporated into the consolidated proppant particulates, the wax particulates may melt as a result of the temperature of the formation. A problem with this method is that the wax has been known to resolidify in the well, causing a multitude of problems. Another method that has been used is to add an oil-soluble resin to the proppant composition; however, this method has not been successful because of, among other things, nonuniform placement of the particles.

Another way to address fracture conductivity and proppant matrix permeability has been to use bigger proppant particulates. However, there are practical limits to the size of the proppant that may be used. For instance, if overly large particles are used, premature screen out at the perforations and/or fractures during the proppant stage of fracturing treatment often occurs as large size proppant particulates are injected into the fractures. In addition, by using overly large proppant particles, the ability to control formation sand may be lost as the formation sand or fines tend to invade or penetrate the large pore space of the proppant pack during production of hydrocarbons, thus choking the flow paths of the fluids.

SUMMARY OF THE INVENTION

The present invention provides improved compositions and methods for enhancing fluid flow from a subterranean formation. In preferred embodiments, the present invention provides compositions and methods for enhancing subterranean well productivity by enhancing fracture conductivity.

A method of increasing the conductivity of a fracture in a portion of a subterranean formation comprising providing a slurry comprising a fracturing fluid, a degradable material, and proppant particulates coated with a tackifying agent; allowing the degradable material to become at least temporarily attached to the tackifying agent coated onto the proppant particulates so as to avoid substantial segregation of the degradable material from the proppant particulates within the slurry; introducing the slurry to the fracture and allowing the proppant particulates and degradable material to form a substantially uniform particulate pack; and, allowing the degradable material to degrade and produce a particulate pack having voids therein.

A method of creating a particulate pack having voids therein comprising providing a slurry comprising a fracturing fluid, a degradable material capable of undergoing an irreversible degradation down hole, and proppant particulates coated with a tackifying agent; allowing the degradable material to become at least temporarily attached to the tackifying agent coated onto the proppant particulates so as to avoid segregation of the degradable material form the proppant particulates within the slurry; introducing the slurry to the fracture and allowing the proppant particulates and degradable material to form a substantially uniform particulate pack; and, allowing the degradable material to degrade and produce a particulate pack having voids therein.

The objects, features and advantages of the present invention will be readily apparent to those skilled in the art upon a reading of the description of the preferred embodiments which follows.

DESCRIPTION OF PREFERRED EMBODIMENTS

The present invention provides improved compositions and methods for enhancing fluid flow from a subterranean formation. In preferred embodiments, the present invention provides compositions and methods for enhancing subterranean well productivity by enhancing fracture conductivity. The compositions and methods of the present invention may be used to enhance the permeability of proppant matrixes within fractures so that fluids from the subterranean formation may flow more freely to the well bore without negatively affecting the ability of the proppant matrix to perform other desired functions within the fracture, e.g., maintaining the integrity of a fracture or providing a sand control means.

The proppant slurries of the present invention comprise a fracturing fluid, proppant particulates, and a degradable material capable of undergoing an irreversible degradation down hole. The term "irreversible" as used herein means that the degradable material, once degraded down hole, should not recrystallize or reconsolidate while down hole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, among other things, a chemical or thermal reaction or a reaction induced by radiation.

Any fluid suitable as a fracturing fluid for use in a fracturing or frac-packing application may be used in accordance with the teachings of the present invention, including aqueous gels, viscoelastic surfactant gels, oil gels, foams, and emulsions. Suitable aqueous gels are generally comprised of water and one or more gelling agents. Suitable foams can be comprised of two immiscible liquids such as an aqueous gelled liquid and a normally gaseous fluid, such as carbon dioxide or nitrogen and suitable emulsions can be comprised of two immiscible fluids such as a hydrocarbon and a gelled aqueous liquid. In exemplary embodiments of the present invention, the fracturing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, fracturing fluid, inter alia, reduces fluid loss and allows the fracturing fluid to transport significant quantities of suspended proppant particles. The water used to form the fracturing fluid may be salt water, brine, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling typically comprise biopolymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be biopolymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethyl hydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al, the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one metal that is capable of crosslinking at least two gelling agent molecules. Examples of suitable crosslinkers include, but are not limited to, zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. The crosslinker also may comprise a boron containing compound. Examples of suitable boron-containing crosslinkers include, but are not limited to, boric acid, disodium octaborate tetrahydrate, soldium diborate, pentaborates, ulexite and colemanite. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in an amount in the range from about 0.001% to about 10% by weight of the water in the fracturing fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked fracturing fluids may also include internal delayed gel breakers such as enzyme, oxidizing, acid buffer, or temperature-activated gel breakers. The gel breakers cause the viscous carrier fluids to revert to thin fluids that can be produced back to the surface after they have been used to place proppant particles in subterranean fractures. The gel breaker used is typically present in the fracturing fluid in an amount in the range of from about 0.5% to about 10% by weight of the gelling agent. The fracturing fluids may also include one or more of a variety of well-known additives, such as gel stabilizers, fluid loss control additives, clay stabilizers, bactericides, and the like.

Any proppant particulate suitable for use in subterranean applications is suitable for use in the compositions and methods of the present invention. For instance, sand, particulate nut or seed hulls, bauxite, ceramic, polymeric material, resinous material, resinous material comprising particulate nut or seed hulls, and the like are all suitable. Suitable sizes range from 2 to 400 U.S. mesh, but are preferably in the range of 4 to 100 U.S. mesh. In some embodiments, the proppant particulates may be coated with a curable resin. Any type of curable resin that will enable the proppant particulates to consolidate within a fracture in the formation is suitable for use in the present invention, e.g., epoxies, furan, phenolics, furfuryl aldehyde, furfuryl alcohol, or mixtures thereof. If a curable resin is used, preferably the proppant particulates are coated with a curable resin prior to being mixed with the degradable material. Any portion of the proppant particulates may be coated with a curable resin. For instance, just the tail-end portion, the first portion and the tail-end portion, or the entirety of the proppant particulates may be coated. In certain embodiments, at least a majority of the proppant particulates are coated with curable resin and allowed to consolidate in-situ to form a hardenable mass.

In some embodiments, it may be desirable to coat the proppant particulates with a tackifying agent rather than a curable resin. Such a tackifying agent is preferably incorporated with the proppant particulates before they are mixed with the degradable material. The tackifying agent, among other things, helps distribute the degradable material within the proppant composition and keep it in place within the proppant matrix. Using a tackifying agent as opposed to a curable resin may be particularly useful if the degradable material used has a low density or specific gravity or has a substantially different particle size than the proppant particulates. The use of a tackifying agent may help to reduce or eliminate the negative effects of segregation between the proppant particulates and the degradable material. Often, the degradable material will exhibit a significantly different density from the proppant particulates. In such cases, when the particulates are slurried into a carrier fluid to be sent to a portion of a subterranean formation the degradable material often separates from the denser proppant particulates. Since the methods of the present invention preferably create a relatively uniform pack of proppant particulates mixed with degradable material, that separation may cause the job to be less successful. The tacky nature of a chosen tackifying agent may help the chosen degradable material to at least temporarily attach to the proppant particulates. By becoming so attached, the negative effects of segregation may be reduced or eliminated.

In one embodiment of the present invention, the tackifying agent is coated onto the proppant particulates early in the proppant stage of the fracturing treatment. Then, resin-coated proppant particulates are used during the tail-in stage of the fracturing treatment. In another embodiment, the tackifying agent and the curable resin are coated on the proppant particulates intermittently.

Compositions suitable for use as tackifying agents in the present invention comprise any compound that, when in liquid form or in a solvent solution, will form a non-hardening coating upon a particulate. Some examples of suitable tackifying agents include non-aqueous tackifying agents, aqueous tackifying agents, and silyl modified polyamides.

Suitable non-aqueous tackifying agents generally comprise polyamides that are liquids or in solution at the temperature of the subterranean formation such that they are, by themselves, non-hardening when introduced into the subterranean formation. One suitable such tackifying agent comprises a condensation reaction product comprised of a polyacid and a polyamine. Such commercial products include compounds such as mixtures of C36 dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Other suitable tackifying agents are described in U.S. Pat. No. 5,853,048 issued to Weaver, et al. and U.S. Pat. No. 5,833,000 issued to Weaver, et al., the relevant disclosures of which are herein incorporated by reference.

Such non-aqueous tackifying agents may be either used such that they form non-hardening coating or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be admixed with the tackifying compound in an amount of from about 0.01% to about 50% by weight of the tackifying compound to effect formation of the reaction product. In some preferably embodiments, the compound is present in an amount of from about 0.5% to about 1% by weight of the tackifying compound. Suitable multifunctional materials are described in U.S. Pat. No. 5,839,510 issued to Weaver, et al., the relevant disclosure of which is herein incorporated by reference.

Another suitable group of tackifying agents is aqueous tackifying agents; that is, tackifying agents that are soluble in aqueous fluids. Suitable aqueous tackifying agents are capable of forming at least a partial coating upon the surface of a particulate (such as proppant). Generally, suitable aqueous tackifying agents are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying agents enhances the grain-to-grain contact between the individual particulates within the formation (be they proppant particulates, formation fines, or other particulates), helping bring about the consolidation of the particulates into a cohesive, flexible, and permeable mass.

Examples of aqueous tackifier compounds suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. These and other suitable aqueous tackifying agents are described in U.S. application Ser. No. 10/864,061, filed on Jun. 9, 2004, and U.S. application Ser. No. 10/864,618, filed on Jun. 9, 2004, the relevant disclosures of which are herein incorporated by reference.

Silyl-modified polyamide compounds suitable for use as a tackifying agent in the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

Regardless of the chosen resin or tackifying agent, to appreciate some of the beneficial effects of the present invention, the proppant particulates should form a proppant matrix within a fracture in the formation. The term "proppant matrix" as used herein refers to the formation of a mass of proppant particulates within a fracture in a subterranean formation. Where the proppant particulates are coated with a resin or a tackifying agent, the matrix may consolidate and avoid migration of the proppant particulates once the operation is complete. In a preferred embodiment, the removal of the degradable material occurs after the proppant matrix has significantly developed and become relatively stable to minimize shifting or rearrangement of proppant particulates within the matrix.

The degradable material is incorporated in the proppant composition and becomes distributed throughout the proppant matrix, most preferably uniformly, as the proppant matrix forms. After the requisite time period dictated by the characteristics of the particular degradable material used, the degradable material undergoes an irreversible degradation. This degradation, in effect, causes the degradable material to substantially be removed from the proppant matrix. As a result, voids are created in the proppant matrix. These voids enhance the permeability of the matrix, which results, among other things, in enhanced conductivity. Enhanced fracture conductivity enhances well productivity; as well productivity is a function, among other things, of fracture conductivity.

Nonlimiting examples of degradable materials that may be used in conjunction with the present invention include, but are not limited to, degradable polymers, dehydrated salts, and/or mixtures of the two.

As for degradable polymers, a polymer is considered to be "degradable" herein if the degradation is due to, among other things, chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the present invention include but are not limited to those described in the publication of Advances in Polymer Science, Vol. 157 entitled "Degradable Aliphatic Polyesters" edited by A. C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable polymers include polysaccharides such as dextran or cellulose; chitins; chitosans; proteins; aliphatic polyesters; poly(orthoesters); poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); and polyphosphazenes. Of these suitable polymers, poly(orthoesters), aliphatic polyesters, and polyanhydrides are preferred.

Aliphatic polyesters degrade chemically, among other things, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polyester matrices more bulk eroding.

Plasticizers may be present in the polymeric degradable materials of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers are well known in the art and include, but are not limited to, derivatives of oligomeric lactic acid. As used herein the term "derivatives of oligomeric lactic acid" includes derivatives of oligomeric lactide. In addition to the other qualities above, the plasticizers may enhance the degradation rate of the degradable polymeric materials. The plasticizers, if used, are preferably at least intimately incorporated within the degradable polymeric materials.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of particularly suitable degradable polymer useful in the present invention. Polyanhydride hydrolysis proceeds, among other things, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

Dehydrated salts may be used in accordance with the present invention as a degradable material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours, depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one should consider the degradation products that will result. These degradation products should not adversely affect other operations or components. The choice of degradable material also can depend, at least in part, on the conditions of the well, e.g., well bore temperature. For instance, lactides have been found to be suitable for lower temperature wells, including those within the range of 60° F. to 150° F., and poly(lactides) have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

Also, we have found that a preferable result is achieved if the degradable material degrades slowly over time as opposed to instantaneously. Even more preferable results have been obtained when the degradable material does not begin to degrade until after the proppant matrix has developed some compressive strength. The slow degradation of the degradable material, among other things, helps to maintain the stability of the proppant matrix.

The specific features of the degradable material may be chosen or modified to provide the proppant matrix with optimum conductivity while maintaining its desirable filtering capability. Preferably, the degradable material is selected to have a size and shape similar to the size and shape of the curable proppant particulates to help maintain substantial uniformity within the mixture. It is preferable that the proppant particulates and the degradable material do not segregate within the proppant composition. Whichever degradable material is used, the degradable materials may have any shape, depending on the desired characteristics of the resultant voids in the proppant matrix including, but not limited to, particles having the physical shape of platelets, shavings, flakes, ribbons, rods, strips, spheroids, toroids, pellets, tablets, or any other physical shape. The physical shape of the degradable material should be chosen so as to enhance the desired shape and relative composition of the resultant voids within the proppant matrix. For example, a rod-like particle shape may be suitable in applications wherein channel-like voids in the proppant matrix are desired. One of ordinary skill in the art with the benefit of this disclosure will recognize the specific degradable material and the preferred size and shape for a given application.

The proppant particulates and degradable material may either be pre-blended or it may be prepared on-the-fly at the well site. Preferably, the proppant particles and the degradable material should be mixed so as to form a substantially uniform mixture in the fracturing treatment fluid. Any conventional fracturing fluid may be used in accordance with the present invention including aqueous gels, viscoelastic surfactant gels, oil gels, and emulsions. Suitable aqueous gels are generally comprised of water and one or more gelling agents. Suitable emulsions can be comprised of two immiscible liquids such as an aqueous gelled liquid and a liquefied, normally gaseous, fluid, such as carbon dioxide or nitrogen. In exemplary embodiments of the present invention, the fracturing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and crosslinked, fracturing fluid, among other things, reduces fluid loss and allows the fracturing fluid to transport significant quantities of suspended proppant particles. The water used to form the fracturing fluid may be salt water, brine, or any other aqueous liquid that does not adversely react with the other components. The density of the water can be increased to provide additional particle transport and suspension in the present invention.

The concentration of the degradable material in the proppant composition ranges from about 0.1% to about 30%, based on the weight of the proppant in the mixture. A concentration of degradable material between about 1% and about 5% by weight of the proppant may be preferable. Additionally, the relative amounts of the degradable material in the proppant composition should not be such that when degraded, an undesirable percentage of voids result in the proppant matrix, making the proppant matrix potentially ineffective in maintaining the integrity of the fracture. One of ordinary skill in the art, with the benefit of this disclosure, will recognize an optimum concentration of degradable material that provides desirable values in terms of enhanced conductivity or permeability without undermining the stability of the proppant pack itself.

To facilitate a better understanding of the present invention, the following examples of preferred embodiments are given. In no way should such examples be read to limit the scope of the invention.

EXAMPLES

Proppant matrixes were formed by mixing 20/40-mesh bauxite proppant with various amounts of degradable material, specifically poly(lactic acid). 250 grams of proppant was first coated with 11 ml of a curable epoxy resin. Poly(lactic acid) particulates were then added to the resin-coated proppant and blended thoroughly to form a homogeneous blend. The amounts of poly(lactic acid) added to each composition were 0%, 5%, and 10% and 20% by weight of the proppant particulates in the composition. Mixing the mixture with water formed a slurry. The slurry was then packed into a brass flow cell and placed in an oven to be cured under a 500-psi stress load at 275° F. for 4 days. After this curing period, permeability testing was performed for the consolidated proppant matrixes. Table 1 reports the resulting permeability values obtained for the proppant matrixes.

TABLE 1

| Amount of Polylactic Acid Particulate Added to the Proppant (weight %) | Proppant Pack Permeability (Darcies) |
|---|---|
| 0 | 52 |
| 5 | 100 |
| 10 | 163 |
| 20 | 167 |

As can be seen from Table 1, the permeability of the proppant matrix was enhanced by the addition of degradable material, specifically, poly(lactic acid) particulates. This enhancement increased with the percentage by weight of the degradable material used.

Thus, the present invention is well adapted to carry out the objects and attain the ends and advantages mentioned as well as those which are inherent therein. While numerous changes may be made by those skilled in the art, such changes are encompassed within the spirit and scope of this invention as defined by the appended claims.

What is claimed is:

1. A method of increasing the conductivity of a fracture in a portion of a subterranean formation comprising:
   providing a slurry comprising a fracturing fluid, a degradable material, and proppant particulates coated with a tackifying agent;
   allowing the degradable material to become at least temporarily attached to the tackifying agent coated onto the proppant particulates so as to avoid substantial segregation of the degradable material from the proppant particulates within the slurry;
   introducing the slurry to the fracture and allowing the proppant particulates and degradable material to form a substantially uniform particulate pack; and,
   allowing the degradable material to degrade and produce a particulate pack having voids therein.

2. The method of claim 1 wherein the fracturing fluid is selected from the group consisting of an aqueous gel, a viscoelastic surfactant gel, an oil gel, an emulsion, a foamed fluid, and a combination thereof.

3. The method of claim 1 wherein the proppant particulates are selected from the group consisting of sand, particulate nut hulls, particulates seed hulls, bauxite material, ceramic material, polymeric material, resinous material, resinous material comprising particulate nut hulls, resinous material comprising particulate seed hulls, and a combination thereof.

4. The method of claim 1 wherein the tackifying agent is selected from the group consisting of a non-aqueous tackifying agent; an aqueous tackifying agent; a silyl-modified polyamide; and a combination thereof.

5. The method of claim 4 wherein the non-aqueous tackifying agent is selected from the group consisting of a polyamide, a polyester, a polycarbonate, polycarbamate, a natural resin, and a combination thereof.

6. The method of claim 5 wherein the non-aqueous tackifying agent further comprises a multifunctional material.

7. The method of claim 6 wherein the multifunctional material is selected from the group consisting of an aldehyde; a dialdehyde; a hemiacetal; an aldehyde releasing compound; a diacid halide; a dihalide; a polyacid anhydride; an epoxide; furfuraldehyde, glutaraldehyde or aldehyde condensates; and a combination thereof.

8. The method of claim 4 wherein the aqueous tackifying agent is selected from the group consisting of an acrylic acid polymer, acrylic acid ester polymer, acrylic acid derivative polymer, acrylic acid homopolymer, acrylic acid ester homopolymer, acrylamido-methyl-propane sulfonate polymer, acrylamido-methyl-propane sulfonate derivative polymer, acrylamido-methyl-propane sulfonate co-polymer, acrylic acid/acrylamido-methyl-propane sulfonate co-polymer, and copolymers thereof, and mixtures thereof.

9. The method of claim 8 wherein the aqueous tackifying agent is made tacky through exposure to an activator and wherein the activator is selected from the group consisting of an organic acid, an anhydride of an organic acid, an inorganic acid, an inorganic salt, a charged surfactant, a charged polymer, and a combination thereof.

10. The method of claim 4 wherein the silyl-modified polyamide is a reaction product selected from the group consisting of a reaction product of a silating compound with a polyamide and a reaction product of a silating compound with mixture of polyamides.

11. The method of claim 1 wherein the degradable material is selected from the group consisting of a polysaccharide; a chitin; a chitosan; a protein; an aliphatic polyester; a poly(lactide); a poly(glycolide); a poly(ε-caprolactone); a poly(hydroxybutyrate); a poly(anhydride); an aliphatic polycarbonate; a poly(orthoester); a poly(amino acid); a poly(ethylene oxide); a polyphosphazene; and a combination thereof.

12. The method of claim 1 wherein the degradable material comprises a stereoisomer of a poly(lactide).

13. The method of claim 1 wherein the degradable material comprises a dehydrated salt.

14. The method of claim 13 wherein the dehydrated salt is selected from the group consisting of anhydrous sodium tetraborate and anhydrous boric acid.

15. The method of claim 1 wherein the degradable material comprises a solid anhydrous borate material.

16. The method of claim 1 wherein the degradable material further comprises a plasticizer.

17. The method of claim 1 wherein the degradable material comprises a combination of poly(lactic acid) and a compound chosen from the group consisting of sodium borate and boric oxide.

18. The method of claim 1 wherein the degradable material is present in the proppant composition in an amount sufficient to create a desirable number of voids in the proppant matrix.

19. The method of claim 1 wherein the slurry comprises from about 0.1% to about 30% of degradable material to the weight of the proppant particulates.

20. The method of claim 1 wherein the slurry comprises from about 1% to about 5% of degradable material to the weight of the proppant particulates.

21. A method of creating a particulate pack having voids therein comprising:
providing a slurry comprising a fracturing fluid, a degradable material capable of undergoing an irreversible degradation down hole, and proppant particulates coated with a tackifying agent;
allowing the degradable material to become at least temporarily attached to the tackifying agent coated onto the proppant particulates so as to avoid segregation of the degradable material from the proppant particulates within the slurry;
introducing the slurry to a fracture and allowing the proppant particulates and degradable material to form a substantially uniform particulate pack; and,
allowing the degradable material to degrade and produce a particulate pack having voids therein.

22. The method of claim 21 wherein the fracturing fluid is selected from the group consisting of an aqueous gel, a viscoelastic surfactant gel, an oil gel, an emulsion, a foamed fluid, and a combination thereof.

23. The method of claim 21 wherein the proppant particulates are selected from the group consisting of sand, particulate nut hulls, particulates seed hulls, bauxite material, ceramic material, polymeric material, resinous material, resinous material comprising particulate nut hulls, resinous material comprising particulate seed hulls and a combination thereof.

24. The method of claim 21 wherein the tackifying agent is selected from the group consisting of a non-aqueous tackifying agent; an aqueous tackifying agent; a silyl-modified polyamide; and a combination thereof.

25. The method of claim 24 wherein the non-aqueous tackifying agent is selected from the group consisting of a polyamide, a polyester, a polycarbonate, polycarbamate, a natural resin and a combination thereof.

26. The method of claim 25 wherein the non-aqueous tackifying agent further comprises a multifunctional material.

27. The method of claim 26 wherein the multifunctional material is selected from the group consisting of an aldehyde; a dialdehyde; a hemiacetal; an aldehyde releasing compound; a diacid halide; a dihalide; a polyacid anhydride; an epoxide; furfuraldehyde, glutaraldehyde or aldehyde condensates; and a combination thereof.

28. The method of claim 24 wherein the aqueous tackifying agent is selected from the group consisting of an acrylic acid polymer, acrylic acid ester polymer, acrylic acid derivative polymer, acrylic acid homopolymer, acrylic acid ester homopolymer, acrylamido-methyl-propane sulfonate polymer, acrylamido-methyl-propane sulfonate derivative polymer, acrylamido-methyl-propane sulfonate co-polymer, acrylic acid/acrylamido-methyl-propane sulfonate co-polymer, and copolymers thereof, and mixtures thereof.

29. The method of claim 28 wherein the aqueous tackifying agent is made tacky through exposure to an activator and wherein the activator is selected from the group consisting of an organic acid, an anhydride of an organic acid, an inorganic acid, an inorganic salt, a charged surfactant, a charged polymer, and a combination thereof.

30. The method of claim 24 wherein the silyl-modified polyamide is a reaction product selected from the group consisting of a reaction product of a silating compound with a polyamide and a reaction product of a silating compound with mixture of polyamides.

31. The method of claim 21 wherein the degradable material is selected from the group consisting of a polysaccharide; a chitin; a chitosan; a protein; an aliphatic polyester; a poly(lactide); a poly(glycolide); a poly(ε-caprolactone); a poly(hydroxybutyrate); a poly(anhydride); an aliphatic polycarbonate; a poly(orthoester); a poly(amino acid); a poly (ethylene oxide); a polyphosphazene; and a combination thereof.

32. The method of claim 21 wherein the degradable material comprises a stereo isomer of a poly(lactide).

33. The method of claim 21 wherein the degradable material comprises a dehydrated salt.

34. The method of claim 33 wherein the dehydrated salt is selected from the group consisting of anhydrous sodium tetraborate and anhydrous boric acid.

35. The method of claim 21 wherein the degradable material comprises a solid anhydrous borate material.

36. The method of claim 21 wherein the degradable material further comprises a plasticizer.

37. The method of claim 21 wherein the degradable material comprises a combination of poly(lactic acid) and a compound chosen from the group consisting of sodium borate and boric oxide.

38. The method of claim 21 wherein the degradable material is present in the proppant composition in an amount sufficient to create a desirable number of voids in the proppant matrix.

39. The method of claim 21 wherein the slurry comprises from about 0.1% to about 30% of degradable material to the weight of the proppant particulates.

40. The method of claim 21 wherein the slurry comprises from about 1% to about 5% of degradable material to the weight of the proppant particulates.

* * * * *